July 5, 1938.  F. M. GUY  2,122,837
UNIVERSAL COUPLING
Filed Jan. 31, 1936   3 Sheets-Sheet 1
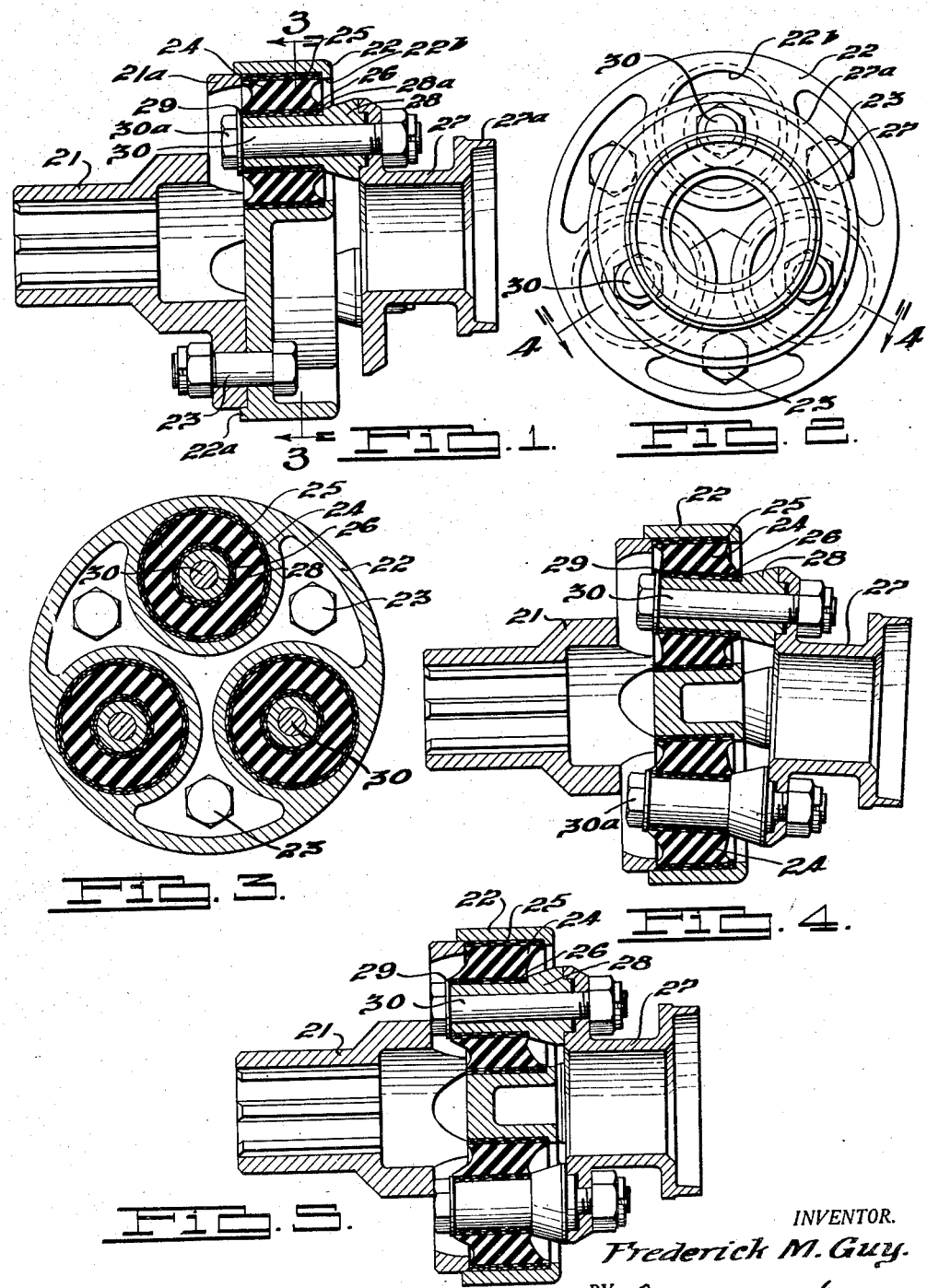
INVENTOR.
Frederick M. Guy.
BY
ATTORNEYS.

July 5, 1938.   F. M. GUY   2,122,837
UNIVERSAL COUPLING
Filed Jan. 31, 1936   3 Sheets-Sheet 2

INVENTOR.
Frederick M. Guy.
BY
ATTORNEYS.

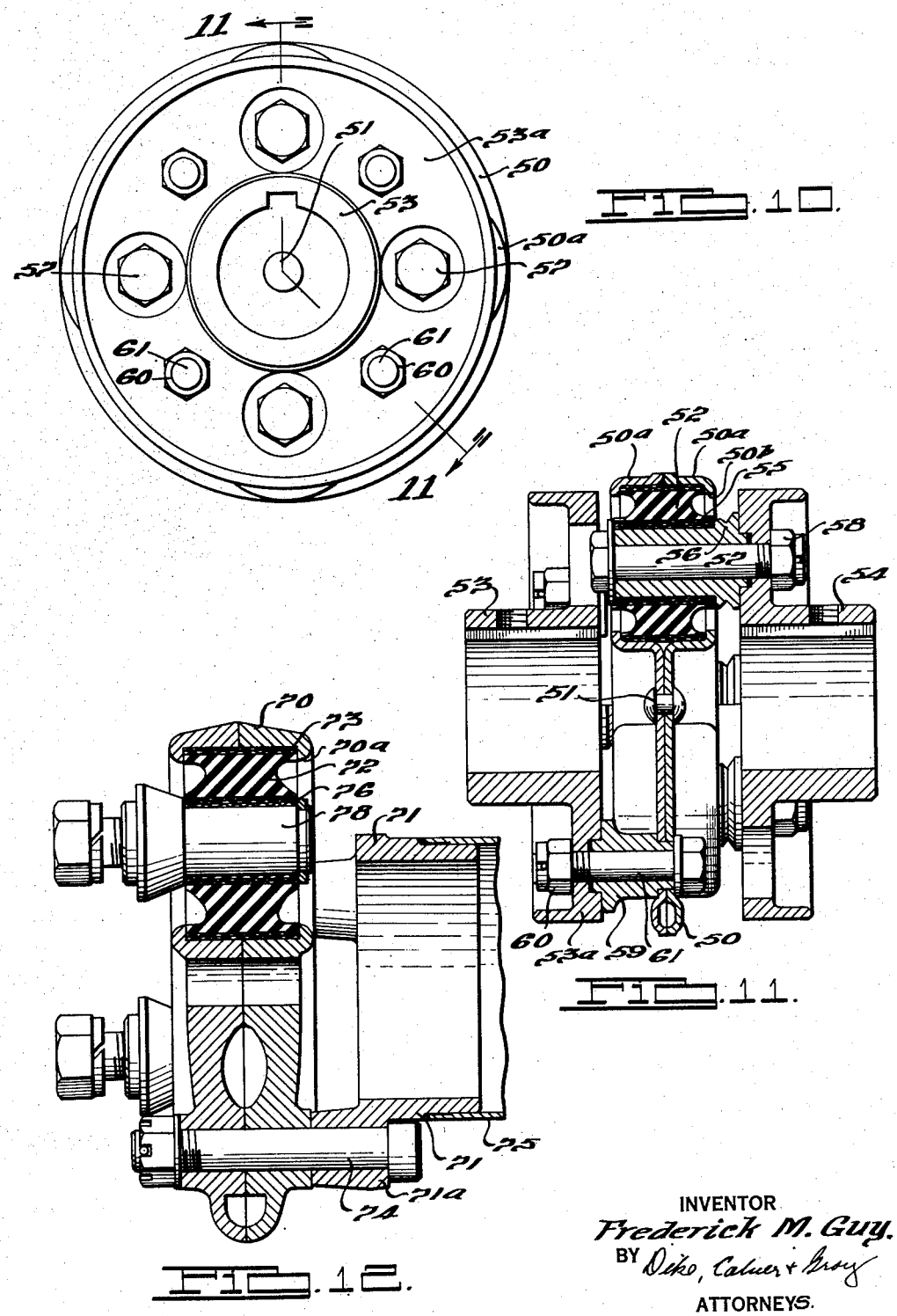

Patented July 5, 1938

2,122,837

UNITED STATES PATENT OFFICE 2,122,837

UNIVERSAL COUPLING

Frederick M. Guy, Detroit, Mich., assignor to Guy and Murton, Incorporated, Detroit, Mich., a corporation of Michigan Application January 31, 1936, Serial No. 61,709

4 Claims. (Cl. 64—11)

This invention relates to universal couplings and in particular to universal couplings in which resilient elements are interposed between the driving and driven shafts to provide a flexible driving connection between the shafts, while permitting angular, parallel and endwise misalignments of the shafts.

It is an important object of my invention to provide a universal coupling adapted particularly, but not exclusively for use in motor vehicle construction which permits relative movements between the driving and driven shafts without requiring a slip joint or spline between the propeller shaft and a member connected therewith.

It is a further object of my invention to provide universal couplings in which power is transmitted through the coupling with the minimum amount of power loss.

It is a further object of my invention to provide a universal coupling, particularly but not exclusively adapted for use in motor vehicle construction and which permits the propeller shaft to revolve about its own center of gravity, thereby eliminating whipping of the shaft.

It is a further object of my invention to provide a universal coupling in which the friction of relatively moving parts and all metal-to-metal moving contacts are eliminated, thereby eliminating need for lubrication of the coupling.

It is a further object of my present invention to provide a universal coupling which provides a resilient driving connection to absorb sudden torque strains in the power transmission system and to provide a yielding but positive driving connection between the coupled shafts.

It is a further object of my present invention to provide a universal coupling, particularly but not exclusively adapted for use in motor vehicle construction which dampens the variations in torque transmitted through it, such for example as the unabsorbed power thrusts from a reciprocating engine having a light fly wheel.

It is a further object of my present invention to provide a universal coupling adapted particularly but not exclusively for use in motor vehicle construction which maintains the teeth of the gears in the transmission and in the rear axle substantially in tight surface contact, thereby eliminating much gear noise or rattle therein.

It is a further object of my present invention to provide a resilient universal coupling which is not affected by grit and dust during its operation and in which excessive wear and deterioration of the resilient elements is prevented.

It is a further object of my present invention to provide a universal coupling which is of simple construction and which because of the absence of all bearing surfaces, does not need to have its parts machined to close tolerances.

It is a further object of my present invention to provide a universal coupling adapted particularly but not exclusively for use in motor vehicle construction which can transmit a comparatively large torque while requiring the minimum amount of resilient material and being of comparatively small external dimensions.

It is a further object of my present invention to provide a universal coupling, particularly but not exclusively adapted for use in motor vehicle construction and in which the greater part of the mass of the coupling is mounted on the fixed rotating shafts connected to the coupling so that when the coupling is used as for example, at one end of an automobile propeller shaft the minimum amount of mass will be carried by the floating propeller shaft.

Other objects of this invention will appear in the following description and appended claims, reference being had to the accompanying drawings forming a part of this specification wherein like reference characters designate corresponding parts in the several views, and wherein:

Fig. 1 is a sectional view of a preferred form of a coupling embodying the present invention and is taken on a plane passing approximately through the axis of the coupling.

Fig. 2 is a right hand end view of the coupling shown in Fig. 1.

Fig. 3 is a sectional view taken substantially on the line 3—3 of Fig. 1 in the direction of the arrows.

Fig. 4 is a staggered sectional view taken substantially on the line 4—4 of Fig. 2 in the direction of the arrows and showing the position of the respective elements of the coupling when the connected shafts are angularly misaligned.

Fig. 5 is a section taken on substantially the same line as Fig. 4 showing the coupling when the connected shafts are displaced axially with respect to each other.

Fig. 10 is an end view of a modified form of a coupling embodying the invention.

Fig. 11 is a staggered sectional view taken substantially on the line 11—11 of Fig. 10 in the direction of the arrows.

Fig. 12 is a sectional view showing a further modification of a device embodying the invention and taken on a plane passing substantially through the axis of the coupling.

Figure 6:
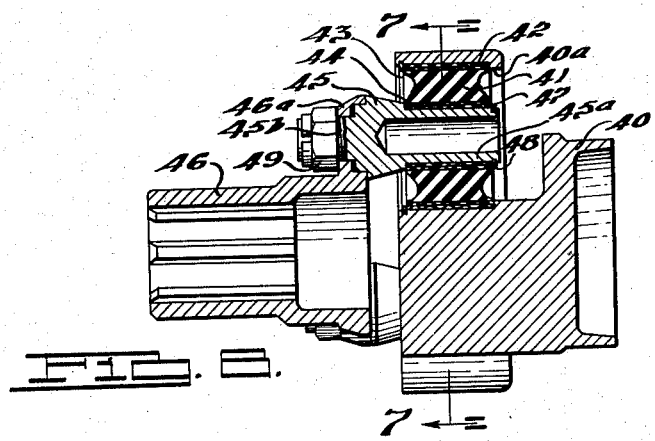
Fig. 6 is a sectional view of a modified form of a coupling embodying the present invention taken on a plane passing approximately through the axis of the coupling.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

The embodiments of the invention shown in the accompanying drawings and described in greater detail below, each comprise a carrier which can be secured to one shaft and which has pockets or flanged openings for retaining resilient bushings in the carrier and a flange which is secured to another shaft and which carries studs secured in the center of the resilient bushings on lines substantially parallel to the axis of said shaft.

A preferred form of the invention shown in Figs. 1 to 5, comprises a flanged hub 21 which is adapted to be secured to the splined end of a shaft such as a transmission main shaft or a differential drive shaft. A carrier member 22 is secured on the face of the flange 21a by bolts 23 and is accurately centered thereon by a projecting circular rim 22a which fits over the edge of the flange 21a. The carrier member 22 has a plurality of cylindrical recesses carrying resilient bushings 24, whose longitudinal axes are substantially parallel to the axis of the hub.

The bushings 24 may be of the type described in my United States Letters Patent No. 1,978,940, in which instance they are composed of a pair of flexible concentric cylinders 25, 26 of equal length and joined to each other by an annular mass of rubber bonded thereto and occupying the greater part of the space between them. The outer cylinders 25 of the bushings are tightly fitted in the recesses in the carrier during assembly and are maintained against displacement from the recesses by the flange 21a on the hub and by inwardly projecting flanges 22b on the carrier around the ends of the cylindrical recesses. The flanges bearing against the ends of the sleeves 25 positively prevent the bushings from moving axially with respect to the carrier.

The inner sleeves or cores 26 of the bushings 24 are connected to a second flanged hub 27 which normally is coaxial with the first flanged hub 21. This connection is made by means of studs 28 which are tightly fitted in the cores 26 of the bushings. The cores 26 are also clamped axially between shoulders 28a on the studs and washers 29 under the heads 30a of bolts 30 which extend axially through the studs and secure them to the flange 27a on the hub 27.

With the above described construction one flanged hub 21 is secured to the shells 25 of the bushings and the other flanged hub 27 is secured to the cores of the bushings. The rubber bodies of the bushing allow the cores to be displaced relative to the shells angularly, laterally and longitudinally. This allows the two hubs to be displaced angularly, laterally and longitudinally with respect to each other while maintaining the shafts in positive driving connection with each other.

When couplings of this type are used in motor vehicle construction for transmitting driving forces between the transmission and the rear axle, the preferable arrangement is to place a coupling at each end of the floating propeller shaft interposed between the transmission and the rear axle, to secure the hubs 21, to which the bushing carriers 22 are bolted, to the ends of the transmission stub shaft and the differential stub shaft, and to secure the ends of the propeller shaft to annular flanges 27a on the hubs 27. The studs projecting from the hubs 27 into the cores of the bushings provide the driving connection between the shafts. No slip joint or spline is required because the normal variations in the distance between the transmission and the differential as the rear axle moves forward with respect to the chassis can be accommodated in the couplings, as shown in Fig. 5. This is accomplished since the bushings allow relatively large longitudinal displacements under relatively small loads.

The lateral displacement resiliently opposed in the coupling allows the propeller shaft to center itself at high speeds and run with little or no vibration even though it may be slightly unbalanced.

Figure 7:
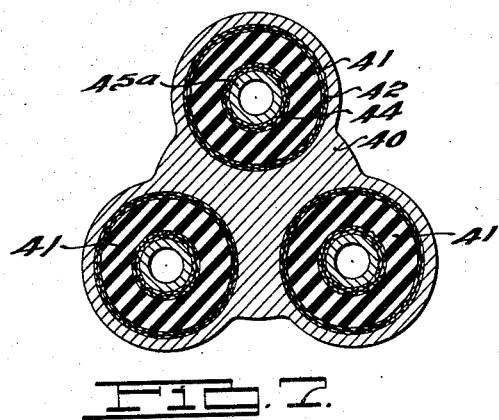
Fig. 7 is a sectional view taken substantially on the line 7—7 of Fig. 6 in the direction of the arrows.
Figure 8:
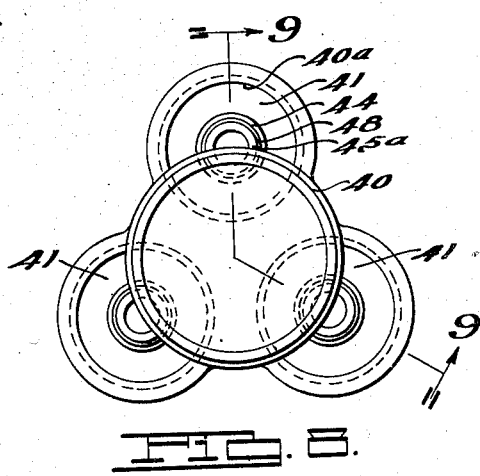
Fig. 8 is a right hand end view of the coupling shown in Fig. 6.
Figure 9:
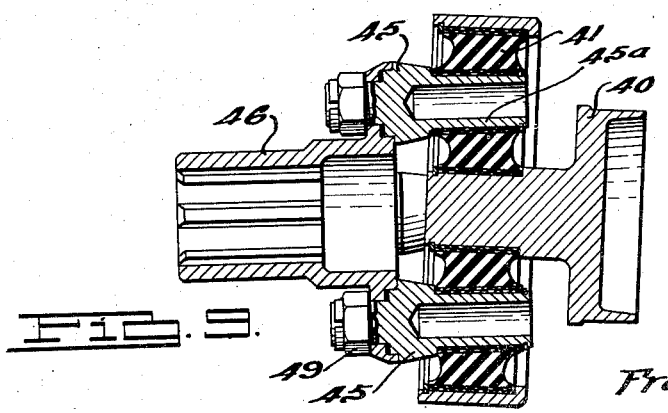
Fig. 9 is a sectional view taken substantially on the line 9—9 of Fig. 8 in the direction of the arrows and showing the joint when the axes of the connected shafts are at an angle to each other.

In the modified form of the invention shown in Figs. 6 to 9, the construction is generally similar to the construction of the preferred form differing chiefly in the detailed structure and in the way it is intended to be mounted. This form of the invention comprises an integral carrier and hub 40 having a plurality of cylindrical recesses whose longitudinal axes are substantially parallel to the axis of the hub. Resilient bushings 41, similar to those heretofore described in connection with the preferred form of the invention, are positively retained in the recesses by inwardly directed flanges 40a at one end of the recess and by snap rings 43 at the other end.

The cores 44 of the bushings are mounted on studs 45 secured to a second flanged hub 46 normally coaxial with the hub 40. The studs 45 have cylindrical bodies 45a which fit tightly in the cores 47 of the bushings, one end of each core butting up against a shoulder on the stud and the other being held by a washer 48 secured to the end of the stud. The studs 45 are secured to the flange 46a by means of screw-threaded nuts 49 engaging threaded stems 45b on the studs which project through the flange.

This form of the invention is designed to be mounted in a manner differing from the manner of mounting the preferred form. In this instance, the bushing carrier is adapted to be secured to the propeller shaft instead of to the transmission stub shaft or differential stub shaft and the studs fitting into the bushing cores are carried by the flange on the splined hub, which is fixed to the stub shafts instead of to the propeller shaft hub as in the previously described embodiment.

The modified form of the invention shown in Figs. 10 and 11 is generally similar to the previously described constructions but has several structural differences. This coupling comprises a two piece bushing carrier, the two duplicate pieces 50 parting on a plane substantially perpendicular to the axis of the coupling. Each of the pieces 50 is a sheet metal stamping in the form of a disc with a plurality of hollow cylindrical bosses 50a spaced evenly around its center with the longitudinal axes of the bosses substantially parallel to the axis of the coupling. The bottoms of the bosses 50a have large holes in them, so that when the two parts of the carrier are placed face to face and secured together by rivets 51 with the hollow sides of the bosses in registry, cylindrical chambers are formed having inwardly directed flanges 50b at their ends.

Each of these chambers contains a resilient bushing 52 similar to the previously described bushings utilized in the other embodiments of the invention. The chamber is preferably slightly smaller than an uncompressed bushing so that upon assembly, the bushings are slightly compressed.

Flanged hubs 53 and 54 lie at each side of the carrier, one, 53, being secured directly to the carrier and the second, 54, being secured to the cores 55 of the bushings 52 by means of studs 56, bolts 57 and nuts 58 similar to those used in the preferred embodiment of the invention. The connection between the first flanged hub 53 and the carrier halves 50 comprises four studs 59 having reduced ends fitting into counterbores in the flange 53a of the hub and fitting into holes in the carrier pieces 50 between the bosses 50a, and the flange. The carrier is held onto shoulders on the studs by means of nuts 60 and bolts 61 extending through axial holes in the studs.

Another embodiment of the invention, shown by way of example in Fig. 12, is similar to that just described in that the carrier is formed of a pair of duplicate pieces 70, but the carrier pieces, the hub 71 to which they are secured, and the method of securing them are different. In this embodiment, the carrier halves 70 are castings or forgings each containing a plurality of cylindrical recesses partially closed by small flanges 70a at their ends away from the central parting plane of the carrier. Thus, when the carrier is assembled with the recesses in the two halves in registry with each other and with bushings 72 in the recesses, the shells 73 of the bushings are clamped endwise between the flanges, besides being a tight fit radially.

The two halves 70 of the carrier are secured together by bolts 74 which extend through them between the bushings 72 and also through lugs 71a on the periphery of the tubular hub 70 to also secure the carrier to the hub. This hub 70 is adapted to be welded to the end of a tubular propeller shaft 75 in the same manner as the flange 27a on the hub in the preferred embodiment of the invention.

The cores 76 of the resilient bushings are secured on studs 78 mounted on a flanged hub (not shown) similar to the studs 46 and the hub 46 in the embodiment of the invention shown in Figs. 6 to 9.

The embodiments of the invention shown in Figs. 6 to 12 inclusive operate in substantially the same way as the embodiment shown in Figs. 1 to 5 inclusive, the choice of which form to be used for any particular application being determined chiefly by the number to be manufactured and the means of production most easily available. In each case, the size and number of bushings may be varied to suit the conditions to be met, bearing in mind that at least two bushings are necessary in any case and three or more are preferable, a smaller number of larger bushings being able to carry the same load and allow greater displacement of the shafts than a coupling with a large number of small bushings but having more rubber in it and being more expensive.

I claim:

1. In a universal joint for connecting two abutting shafts, a plurality of resilient bushings, each of said bushings being secured to the structures of both of said shafts to provide a resilient driving connection therebetween, said bushings being arranged between the ends of the connected shafts and in such a way that a circle inscribed in between said bushings is smaller than the cross section of the end of each of the connected shafts.

2. In a universal joint for connecting drivingly two abutting shafts, a plurality of rubber bushings arranged between the ends of the connected shafts substantially parallel to the axes thereof, each of said bushings being secured to members rigidly connected to the different shafts, all of said bushings being disposed so close together that they lie partly within the space limited by the geometric continuation of the cylindrical surfaces of the ends of the connected shafts.

3. In a universal joint for connecting drivingly two abutting shafts, a carrier member positively secured to one shaft and having a plurality of pockets, a head secured to the other shaft and having a corresponding plurality of studs entering said pockets, a corresponding plurality of rubber members arranged within said pockets, said members being disposed so close to each other that they lie between the ends of the connected shafts and within the space defined by the geometric continuations of the shafts toward each other.

4. In a universal joint for connecting drivingly two abutting shafts, a carrier member rigidly secured to one shaft and having three cylindrical pockets substantially parallel to the axes of the connected shafts, a head rigidly secured to the other shaft and having three studs entering said pockets, three rubber bushings arranged within said pockets and secured by their outer and inner cylindrical surfaces to said carrier member and said studs, respectively, said bushings being disposed so close together that they lie between the ends of the connected shafts and partly within the space defined by the geometric continuations of the shafts toward each other.

FREDERICK M. GUY.